United States Patent [19]

Smith et al.

[11] 4,150,513
[45] Apr. 24, 1979

[54] METHOD FOR GRINDING

[75] Inventors: David L. Smith, Brighton; Norman J. Scherr, Jr., Mt. Clemens, both of Mich.

[73] Assignee: Inovex Corporation, Roseville, Mich.

[21] Appl. No.: 714,405

[22] Filed: Aug. 16, 1976

[51] Int. Cl.² ............................................. B24B 49/16
[52] U.S. Cl. ............................... 51/281 R; 51/165.77; 51/324
[58] Field of Search ............. 51/165 R, 165.77, 165.8, 51/165.83, 281 R, 324

[56] References Cited

U.S. PATENT DOCUMENTS

| | | | |
|---|---|---|---|
| 3,599,376 | 8/1971 | Renner | 51/165.8 |
| 3,622,287 | 11/1971 | Kurimoto | 51/165.8 X |
| 3,691,699 | 9/1972 | Uhtenwoldt | 51/165.8 X |
| 3,698,138 | 10/1972 | Wada | 51/165.8 |
| 3,716,949 | 2/1973 | Price | 51/165.8 |
| 3,724,138 | 4/1973 | Ishikawa | 51/165.8 X |

Primary Examiner—Harold D. Whitehead
Attorney, Agent, or Firm—Gifford, Chandler, VanOphem, Sheridan & Sprinkle

[57] ABSTRACT

A method and apparatus for grinding for use with a grinding machine of the type comprising a circular grinding wheel adapted to rotate about its axis and a spindle adapted to hold a workpiece at a position radially spaced from the grinding wheel wherein the workpiece deflects away from the grinding wheel, and vice versa, as the grinding wheel is moved into the workpiece. The grinding machine includes means for advancing the grinding wheel into the workpiece, such as a threaded shaft and boss arrangement, and gauge means contact the workpiece on the spindle and provide an electrical output signal representative of the diameter of the workpiece. The advancing means is controlled by a microprocessor which, at the initiation of a grinding operation, rapidly advances the grinding wheel into contact with the workpiece a sufficient lineal amount to compensate for the total deflection of the workpiece, grinding wheel, and associated components. Thereafter the microprocessor advances the grinding wheel into the workpiece at a predetermined lineal rate. The output from the gauge means is coupled to the input of the microprocessor so that when the diameter of the workpiece attains predetermined dimension, the microprocessor controls the adavncing means to rapidly retract the grinding wheel from the workpiece at a third lineal rate. Both the first and the third lineal rates are greater than the mean second lineal rate.

4 Claims, 7 Drawing Figures

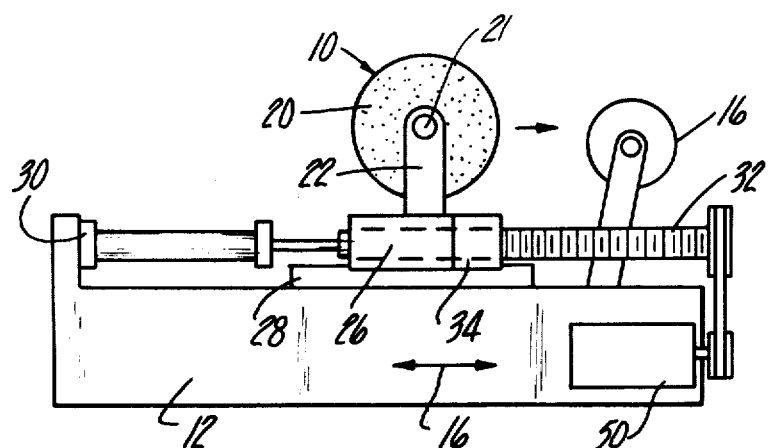
*Fig-1*
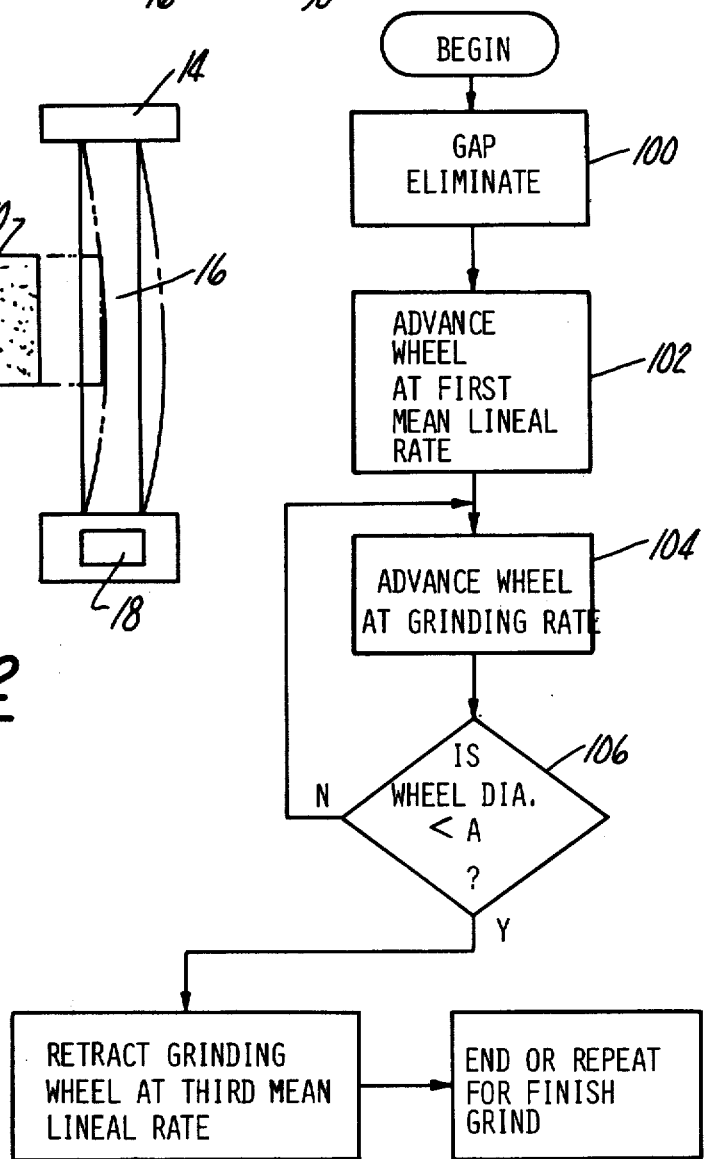
*Fig-2*
*Fig-5*

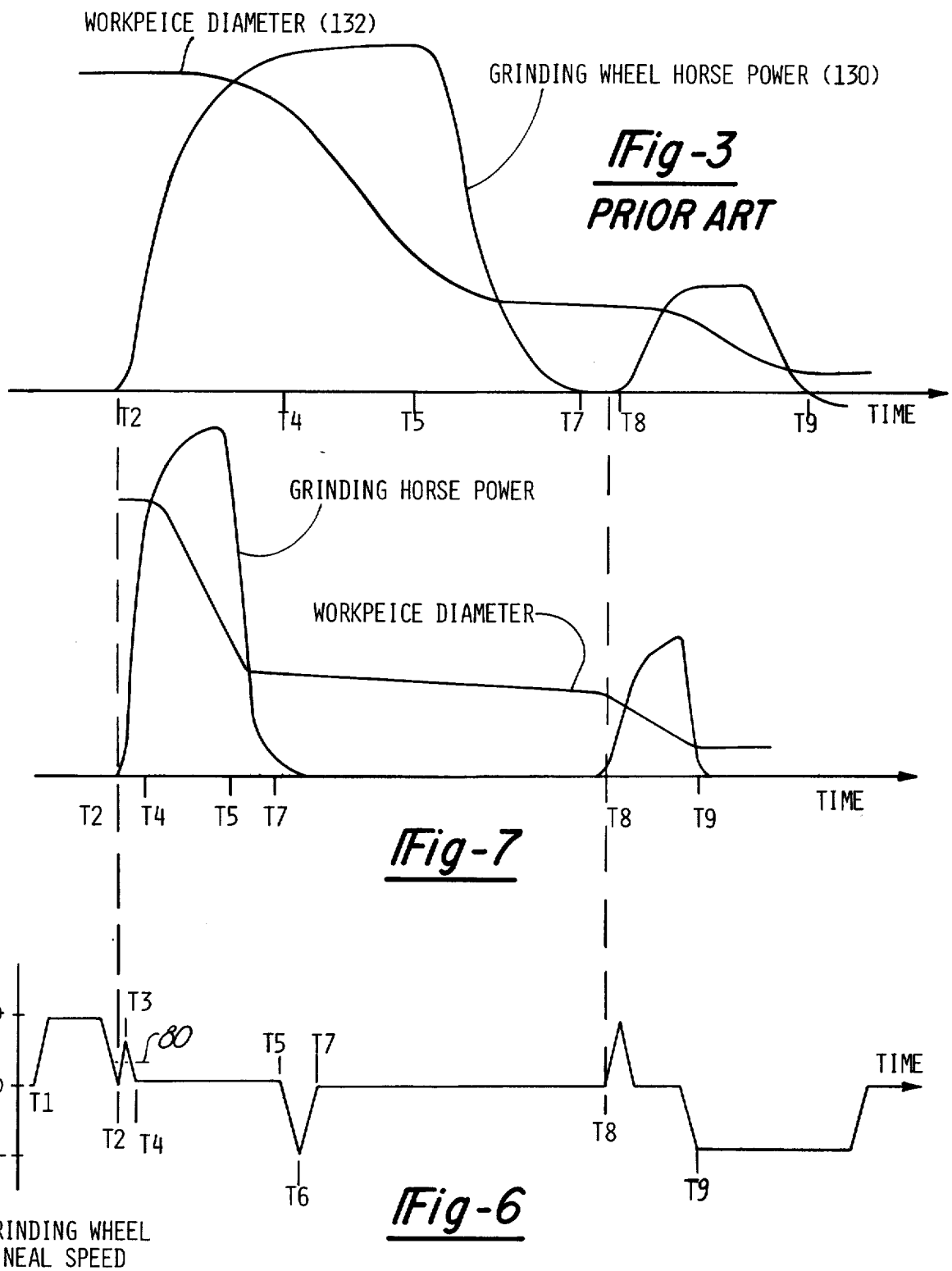

METHOD FOR GRINDING

BACKGROUND OF THE INVENTION

I. Field of the Invention

The present invention relates generally to a method and apparatus for grinding and, more particularly, to such a method and apparatus of the type wherein a rotating grinding wheel is advanced toward a workpiece mounted on a spindle.

II. Description of the Prior Art

The previously known grinding machines typically comprise a circular grinding wheel adapted to rotate about an axle and a spindle adapted to hold a workpiece at a position radially spaced from the grinding wheel. The spindle also rotates the workpiece about its axis.

The grinding wheel is mounted on a table which is radially movable so that the grinding wheel can be moved into contact with the workpiece on the spindle. Contact of the grinding wheel with the workpiece, of course, initiates the grinding operation and removes material from the workpiece in the conventional fashion. The rotation of the workpiece on the spindle is necessary to insure that the material removed from the workpiece is evenly distributed around the workpiece, thus, grinding a true diameter of the workpiece.

Although any of a number of means may be utilized to advance the table supporting the grinding wheel toward the workpiece on the spindle, typically a threaded shaft cooperates with a threaded boss on the table. Consequently, rotation of the threaded shaft in a first rotational direction advances the grinding wheel toward the workpiece while, conversely, rotation of the shaft in the other direction retracts the grinding wheel from the workpiece. Likewise, the speed of rotation of the shaft is directly proportional to the lineal or radial speed of the grinding wheel toward or away from the workpiece.

In the previously known grinding machines, the grinding wheel is advanced towards the workpiece either manually or at a constant and predetermined lineal rate obtained from a steady state rotation of the shaft.

Conventional gauging means contact the outer periphery of the workpiece and provide an electrical output signal representative of the diameter of the workpiece. When the workpiece has been ground down to a predetermined diameter, the advancing means for moving the grinding wheel towards the workpiece are stopped.

Many previously known grinding operations typically comprise two separate grinding operations, namely a rough grinding operation and a finish grinding operation. In the rough grinding operation, the grinding wheel is advanced towards the workpiece at a given lineal speed, for example, 0.004 inches per second which removes most of the excess material from the workpiece. The finish grinding operation occurs subsequently and in this operation the grinding is also moved towards the workpiece in the above-described fashion but at a much slower rate, typically 0.0005 inches per second. A lesser amount of material is removed from the workpiece during the finish grinding operation than in the rough grinding operation but a smoother finish on the workpiece and more accurate control of the workpiece diameter is obtainable during the finish grinding operation.

With these previously known grinding methods and machines, as the grinding wheel contacts and is moved into the workpiece on the spindle, the workpiece bends or deflects away from the grinding wheel and vice versa from the force exerted on the workpiece by the grinding wheel. The amount of total deflection of the workpiece, the grinding wheel, and the associated components, of course, depends upon the grinding machine and the material and construction of the workpiece. However, for a predetermined grinding machine and type of workpiece, the amount of total deflection for a given grinding feed rate remains fairly constant.

During a grinding operation, as the grinding wheel moves initially towards and into the workpiece, a relatively small quantity of material is initially removed from the workpiece due to the aforementioned total deflection despite a constant advance of the grinding wheel into the workpiece. Only when the workpiece, the grinding wheel, and the associated components are fully deflected will the grinding wheel remove material from the workpiece at the rate of advance of the grinding wheel.

This previously known grinding method is disadvantageous in that only a relatively small amount of material is initially removed from the workpiece as the grinding wheel contacts the workpiece. Since the rate of advance of the grinding wheel towards the workpiece is relatively slow, this phenomena unnecessarily prolongs the time required for a single grinding operation. For example, a typical grinding operation requires approximately eleven seconds.

A still further disadvantage of these previously known grinding methods is that due to the total deflection, even when the advance towards the workpiece is halted, the workpiece and grinding components continue to straighten out, i.e., to move toward an undeflected condition. This, of course, results in the continued removal of material from the workpiece and often results in removing more material from the workpiece than tolerances permit.

A still further disadvantage of these previously known grinding machines and methods is that due to the prolonged grinding time required by the previously known machines, the workpiece becomes heated by the friction and expands accordingly; consequently, when the workpiece cools after the grinding operation, the shrinkage incurred during the cooling often renders the workpiece smaller than the tolerance levels permit so that the workpiece must be scrapped.

The previously known grinding machines and methods, thus, suffer two primary disadvantages. First, such machines and methods are time consuming in operation and second, these prior machines and methods form a large percentage of improperly formed workpieces. Improperly formed workpieces are scrapped.

SUMMARY OF THE PRESENT INVENTION

The present invention overcomes the above-mentioned disadvantages by providing a method for grinding which both rapidly and accurately grinds a workpiece.

In brief, with the method of the present invention the grinding wheel is first rapidly advanced toward the workpiece a predetermined lineal amount sufficient to compensate for the total deflection of the workpiece, the grinding wheel, and the associated grinding components.

Thereafter the grinding wheel is moved linearly into the workpiece at a predetermined grinding rate until the workpiece obtains a predetermined diameter or size. At that time, the grinding wheel is rapidly retracted from the workpiece thereby terminating the grinding operation.

As will become hereinafter more clearly apparent, by rapidly moving the grinding wheel into the workpiece a lineal amount sufficient to compensate for the total deflection at the initiation of the grinding operation, the grinding wheel more rapidly and efficiently removes material from the workpiece than the previously known grinding methods. Moreover, by rapidly retracting the grinding wheel out of contact with the workpiece at the end of a grinding operation, machining tolerances can be closely maintained.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a plan diagrammatic view showing a grinding machine according to the present invention;

FIG. 2 is a fragmentary top plan view showing the grinding machine according to the present invention with parts removed and enlarged for clarity;

FIG. 3 is a graph illustrating a prior art grinding method;

FIG. 5 is a flow chart illustrating the steps of the grinding method of the present invention;

FIG. 6 is a chart illustrating the grinding method and apparatus of the present invention; and FIG. 7 is a graph similar to FIG. 3 but according to the method and apparatus of the present invention.

DETAILED DESCRIPTION OF THE PRESENT INVENTION

Figure 4:
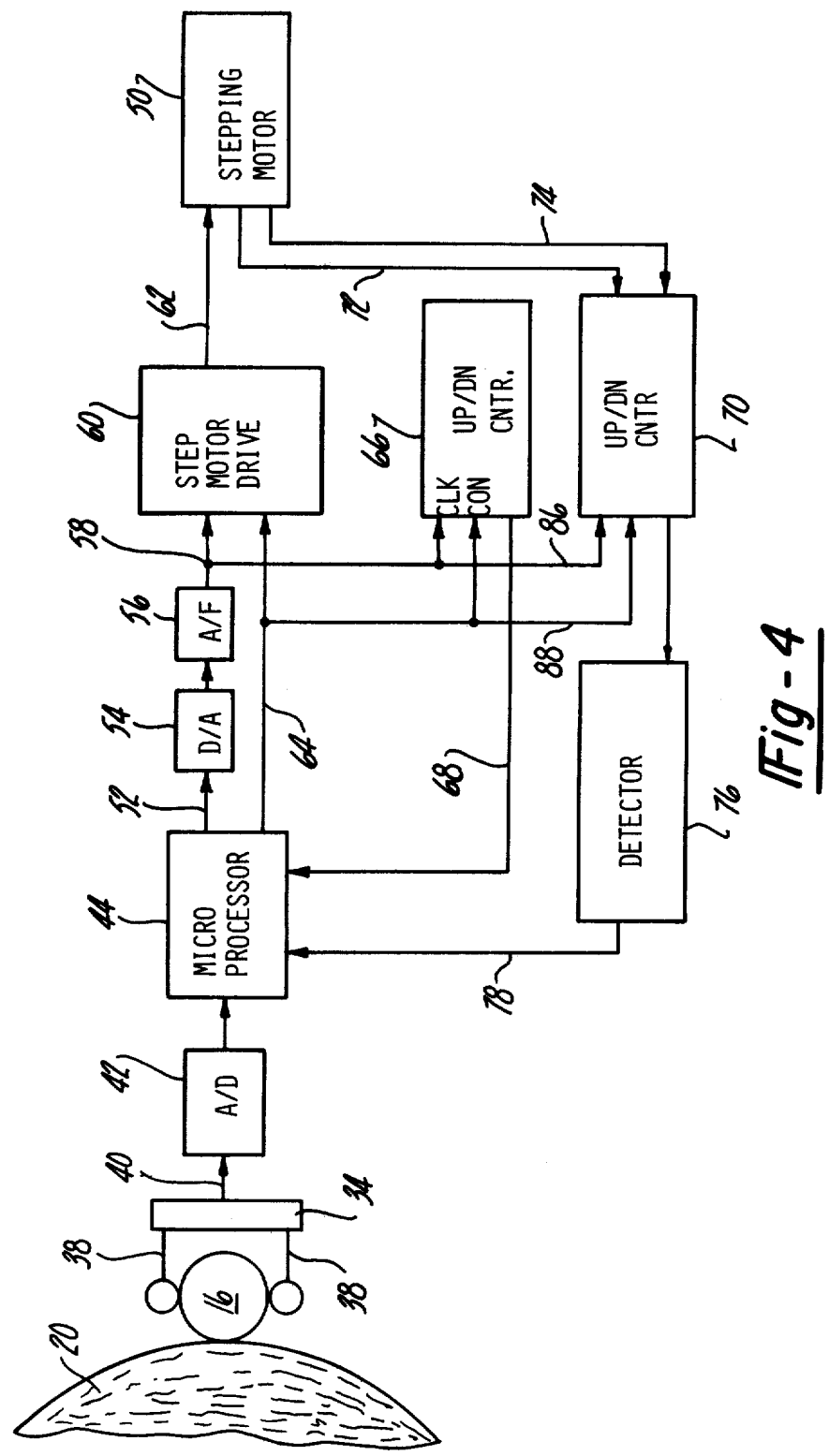
FIG. 4 is a block diagrammatic view showing the components of the grinding machine of the present invention.

With reference to FIGS. 1 and 2 the grinding device 10 of the present invention is thereshown. The grinding device 10 includes a support housing 12 upon which a workpiece spindle 14 is secured. The workpiece spindle 14 is adapted to carry a workpiece 16 in the conventional manner and conventional means 18 rotatably turn the workpiece 16 via the spindle 14 at any desired rotational speed.

A circular grinding wheel 20 is rotatably mounted on an axle 21 which in turn is carried by supports 22 so that the axis of rotation 24 of the grinding wheel 20 is substantially parallel to the axis of rotation of the workpiece 16.

The grinding wheel support 22 in turn is secured to a carriage 26 which is slidably mounted on appropriate tracks 28 secured to the support housing 12. Conventionally a hydraulic cylinder and piston arrangement 30 is operatively connected to the carriage 26 and is adapted to shift the carriage 26 linearly toward or away from the workpiece 16. The hydraulic cylinder and piston arrangement 30 typically moves the grinding wheel 20 from a position spaced from the workpiece (in order to provide easy access to the workpiece) to a position adjacent but not touching the workpiece 16. The hydraulic arrangement 30 is inoperative during a grinding operation and, thus, will not be further described.

In order to linearly move the grinding wheel 20 toward the workpiece 16 at a slow and steady rate, as would occur during a grinding operation, typically a threaded shaft 32 is axially constrained to the support housing 12 and threadably engages a threaded boss 34 in the carriage 26. Consequently, rotation of the shaft 32 in one rotational direction advances the grinding wheel 20 towards the workpiece 16 while, conversely, rotation in the other direction retracts the grinding wheel 20 from the workpiece 16. As should also be apparent, the speed of rotation of the shaft 32 is directly proportional to the lineal speed of the carriage 16, and, hence, the lineal speed of the grinding wheel 20. Other means, of course, can also be utilized to advance the grinding wheel into the workpiece.

It will be understood, however, that alternatively the grinding wheel 20 and axle 21 can be rotatably constrained to the support housing 12 while the workpiece spindle 14 is carried by the carriage 26. In this event the workpiece 16 is moved into the grinding wheel 20 during a grinding operation.

With reference now particularly to FIG. 2, as the grinding wheel 20 is moved linearly towards the workpiece 16, the workpiece 16 deflects a predetermined amount in dependence upon the material and size of the workpiece 16. This deflection is shown with great exaggeration in phantom line in FIG. 2 and while the precise amount of deflection may vary between different workpieces, in practice, workpieces constructed of substantially the same material and of substantially the same size will exhibit substantially the same amount of deflection during a grinding operation.

Similarly, the components of the grinding machine 10 bend or deflect away from the workpiece 16 as the grinding wheel 20 contacts the workpiece 16. These components of the grinding machine 10 which bend include, for example, the grinding wheel axle 21, the carriage 26, the shaft 32, the spindle 14, and the base of the machine 10. The deflection of the grinding wheel axle 21 is shown, with great exaggeration, in phantom line. This deflection also remains fairly constant for a given grinding feed rate.

The sum lineal deflection of both the workpiece 16 and the components of the grinding machine 10, hereinafter called the total deflection D for simplicity, remains substantially constant for a particular rate of lineal advance of the grinding wheel 20 into the workpiece 16.

The grinding machine 10 that has been thus far described is of conventional construction and is commercially available. With reference now to FIG. 3, a graph is thereshown with Grinding Wheel Horsepower indicia on its vertical axis and Time on its horizontal axis. During a grinding operation, the grinding wheel horsepower increases from a relatively low value and stabilizes at a relatively high value in dependence upon the grinding feed rate. During stabilization, the rate of material removal from the workpiece 16 is substantially constant.

FIG. 3 illustrates the prior art grinding method in which the grinding wheel 20 is linearly advanced towards the workpiece 16 at a steady rate, such as 0.004 inches per second. With reference now to FIG. 3 the grinding wheel 20 contacts the workpiece at time T2 and, consequently, the grinding wheel horsepower 130 increases.

Between time T2 and T4, the workpiece 16 deflects or bends away from the grinding wheel 20 and vice versa so that the rate of material removal from the workpiece 16 increases from time T2 to time T4. The workpiece diameter 132, thus, gradually decreases between T2 and T4.

At time T4 the grinding wheel 20 has advanced into the workpiece 16 a lineal distance sufficient to compensate for the total deflection D so that the rate of material removal from the workpiece is thereafter constant and dependent upon the lineal feed rate or rate of advancement of the grinding wheel 20. Likewise the workpiece diameter 132 decreases linearly after time T4.

At time T5 the rotation of the shaft 32, and hence the advance of the grinding wheel 20 towards the workpiece 16, is halted. At this time, however, the workpiece is in a deflected condition and straightens out against the rotating grinding wheel 20 and vice versa. Consequently, between times T5 and T7 the grinding wheel 20 continues to remove material from the workpiece 16 as the workpiece 16 bends back into the grinding wheel 20 and vice versa. The rate of material removal from the workpiece 16 decreases from time T5 to time T7 so that the workpiece diameter 132 gradually becomes constant.

Typically, the rough grinding operation illustrated in FIG. 3 from T2 to T7 is immediately followed by a finish grinding operation shown from T8 to T9. In a finished grinding operation, the rate of advance of the grinding wheel 20 towards the workpiece 16 is considerably slower than the rough grinding operation illustrated in FIG. 3. However, the finish grinding operation is illustrated in FIG. 3 like the rough grinding operation but in smaller proportion.

In a manner which will hereinafter be described in greater detail, according to the present invention, the grinding wheel 20 is first moved at a high mean lineal rate into the workpiece 16 a predetermined lineal distance which is substantially the same as the total deflection D. Thereafter the grinding wheel 20 is advanced into the workpiece 16 at a constant grinding rate and, when the workpiece 16 is ground to a predetermined diameter, the grinding wheel 20 is rapidly retracted away from the workpiece 16 at a high mean lineal speed rate. The net effect of the present invention, then, is to greatly reduce the time between T2 and T4 and also between T5 and T7 thereby greatly reducing the overall required grinding time while increasing accuracy.

The means for controlling the position of the grinding wheel 20 relative to the workpiece 16 is illustrated diagrammatically in FIG. 4. With reference to FIG. 4 a caliper gauge 34 having feeler arms 38 engages the workpiece 16 and generates an electrical signal representative of the diameter of the workpiece 16 along line 40. Such gauges are well known in the grinding field and will, therefore, not be described in greater detail.

The output line 40 from the gauge 36 is fed through an analog/digital (A/D) converter 42 to appropriate input lines of a microprocessor 44 so that the precise diameter of the workpiece 16 is available to the microprocessor 44 at any given moment of time.

The microprocessor 44, in response to the input signal from the gauge 36 and according to a set of preprogrammed instructions contained within the microprocessor and which will subsequently be described in greater detail, generates output signals which control a high speed stepping motor 50 in a manner to be shortly described. The stepping motor 50 is mechanically coupled to the shaft 32 (see FIG. 1) so that rotation of the stepping motor 50 rotatably drives the shaft 32.

Still referring to FIG. 4, the microprocessor 44 generates a digital output along line 52 which is fed through a digital to analog (D/A) converter 54 having its output connected to an analog to frequency (A/F) converter 56 (such as a voltage controlled oscillator) so that the frequency output on line 58 from the A/F converter 56 is proportional to the digital output on line 52 from the microprocessor 44. The line 58 in turn is coupled to a conventional step motor drive 60 which generates an output along line 62 to the stepping motor 50 to control the rotational speed of the motor 50.

A separate output line 64 from the microprocessor 44 is coupled to the drive 60 and controls the direction of rotation of the stepping motor 50 through the drive 60. Consequently, with this arrangement the outputs 52 and 64 from the microprocessor 44 control both the speed and direction of rotation of the stepping motor 50 and, hence, the speed and direction of the carriage 26.

The output line 58 from the A/F converter 56 is also preferably coupled to the clock input of an up/down counter 66 while the direction line 64 from the microprocessor 44 is coupled to the control input of the up/down counter 66. The count in the counter 66 is representative of rotational position of the stepping motor 50 and, thus, of the lineal position of the grinding wheel.

An error counter 70 is provided to detect an error or difference between the number of pulses generated by the A/F converter 56 and the number of pulses received by the stepping motor 50. The error counter 70 is preferably an up/down counter and is coupled by lines 86 and 88 to A/F output line 58 and direction line 64, respectively, so that with the direction line 64 at one state, the counter 70 is incremented by every pulse from the A/F output line 58. Similarly, the stepping motor 50 generates a pulse to the counter 70 along line 72 for each pulse received by it from the drive 60 and an output on line 74 to the counter 70 representative of the direction of rotation of the motor 50. The pulses on line 72, however, decrement the counter 70 when the signal on the direction line 72 corresponds to the last mentioned state on the direction line 64 so that the counter 70 is sequentially incremented and decremented (or vice versa if the direction lines 64 and 72 are inverted) for every pulse generated by the A/F converter 56 and received by the stepping motor 50. The count in the counter 70 thus represents the total error between the signal transmitted to the motor 50 and the signal received by the motor 50. An error greater than a selectable amount is detected by a detector 76 which generates an error signal along line 78 to the microprocessor 44.

With reference now to FIGS. 5 and 6, a grinding operation according to the present invention is there illustrated in flow chart and graph form, respectively. As should be apparent, the flow chart in FIG. 5 is representative of a set of preprogrammed instructions contained within or available to the microprocessor.

At step 100, which corresponds to T1-T2 in FIG. 6, the gap between the grinding wheel 20 and the workpiece 16 is eliminated so that the grinding wheel 20 is adjacent to but not touching the workpiece 16. The microprocessor 44 correlates the output from the caliper gauge 36 and the input from the counter 66 to compute the lineal distance (and, hence, the time duration between T1 and T2) necessary to move the grinding wheel 20 adjacent to the workpiece 16.

At step 102, the microprocessor 44 generates output signals along lines 52 and 64 to rapidly advance the grinding wheel 20 into the workpiece 16 substantially the lineal distance sufficient to compensate for the total deflection D. Step 102 is illustrated between times T2 and T4 in FIG. 6. Ideally, the grinding wheel 20 is instantaneously moved into the workpiece 16 the lineal distance necessary to compensate for the total deflection D. However, due to mechanical limitations and inertia, the grinding wheel 20 is rapidly accelerated linearly into the workpiece 16 between times T2 and T3 and rapidly decelerated between times T3 and T4 so that the mean linear velocity between times T2 and T4 is indicated in phantom line at 80.

At step 104, the grinding wheel 20 is advanced at the desired grinding rate lineally into the workpiece 16. Step 104 is illustrated between times T4 and T5 in FIG. 6. Although the lineal rate of advancement of the grinding wheel 20 between times T4 and T5 is shown as constant, it may be variable while remaining within the scope of the invention. For example, lineal rates of 0.004 and 0.0005 inches per second are typical for a rough and finish grinding operation, respectively.

At time T5, as determined at step 106, the diameter of the workpiece 16 attains a predetermined size "A" which is sensed by the gauge 36 and fed into the microprocessor 44.

At time T5 step 108 in the microprocessor 44 produces output signals on lines 52 and 64 to rapidly retract the grinding wheel 20 away from the workpiece 16 to a position out of contact with the workpiece 16. Ideally, at time T5 the grinding wheel 20 is instantaneously retracted out of contact with the workpiece 16 but, due to the aforementioned mechanical limitations, the grinding wheel 20 is first rapidly accelerated away from the workpiece 16 between T5 and T6 and then decelerated between T6 and T7 until the lineal movement of the grinding wheel 20 is stopped.

Typically following T7, a finish grinding cycle between T8 and T9 is effected. The finish grinding cycle is substantially the same as the rough grinding cycle that has been heretofore described in detail except that the grinding rate determined at step 104 is usually much slower than for the rough grinding operation. Thus, for the sake of brevity, the finish grinding operation will not be described in detail.

With reference now to FIG. 7, a grinding operation according to the present invention is thereshown in graph form which corresponds to the prior art graph shown in FIG. 3. It should also be apparent that the times T1–T9 in FIGS. 3, 7, and 6 all correspond to each other.

Due to the rapid advancement of the grinding wheel 20 into the workpiece 16 between T2 and T4, the elapsed time between T2 and T4 is much shorter than the corresponding time duration taught by the prior art. Consequently, the workpiece diameter 110 decreases almost linearly between T2 and T7. The gradual reduction of the workpiece diameter 110 between T7 and T8 in FIG. 7 represents thermal contraction as the workpiece 16 cools. Between times T8 and T9, i.e., during the finish grinding operation, the workpiece diameter also decreases virtually linearly as shown in FIG. 7 but at a more gradual slope than for the rough grinding operation.

The grinding method and apparatus of the present invention thus achieves many advantages over the prior art methods. Most notably, the total grinding time required is much less than the prior art methods which provides more efficient use of the grinding machine. For example, by rapidly advancing the grinding wheel into the workpiece at the start of the grinding operation and rapidly retracting the grinding wheel away from the workpiece at the end of the grinding operation, the elapsed time T2–T4 and T5–T7 (see FIGS. 3 and 7) is much less with the present invention than the corresponding prior art time periods. The finish grinding operation, of course, can immediately follow the rough grinding operation.

In addition, with a shorter grinding time the thermal expansion of the workpiece is less than with the prior methods so that more accurate dimensional control of the workpiece is obtainable.

Having thus described our invention many modifications thereto will become apparent to those skilled in the art to which it pertains without deviating from the spirit of the invention as defined by the scope of the appended claims. For example, while it is preferred to use the microprocessor 44 to control the actuation of the stepping motor 50, alternatively, the control circuits for the stopping motor 50 can be hard wired. The microprocessor 44, however, is preferred due to its flexibility obtainable from its reprogrammability. For example the grinding rate determined at step 104 (FIG. 5) can be changed by merely reprogramming the microprocessor.

We claim:

1. A method for grinding for use in conjunction with a grinding machine of the type comprising a first and second member, wherein one member is a circular grinding wheel adapted to rotate about its axis and the other member is a spindle adapted to hold a workpiece at a position linearly spaced from said grinding wheel, wherein one member is linearly movable relative to the other member and whereby said workpiece and the components of the grinding machine bend a predetermined amount as said grinding wheel is moved into said workpiece at a constant predetermined lineal rate, the improvement comprising the steps of:

deflecting said workpiece and said components said predetermined amount by contacting and rapidly advancing the movable member into the other member for said predetermined amount;

immediately thereafter advancing the movable member at said constant predetermined lineal rate toward the other member whereby said workpiece and said components of said grinding machine remain deflected said predetermined amount; and thereafter rapidly retracting the movable member away from the other member so that the grinding wheel is moved out of contact with said workpiece when the diameter of said workpiece attains a predetermined size.

2. The method as defined in claim 1 wherein said first step further comprises the steps of:

accelerating the movable member toward the other member; and thereafter decelerating the movable member whereby said grinding wheel has substantially advanced into said workpiece said predetermined amount at the end of said deceleration.

3. The method as defined in claim 1 wherein said last step further comprises:

accelerating the movable member away from the other member; and thereafter decelerating the movable member whereby said grinding wheel is out of contact with said workpiece at the end of said deceleration.

4. The method as defined in claim 1 wherein said workpiece and the components of the grinding machine bend a second predetermined amount as said grinding wheel is moved into said workpiece at a second constant predetermined lineal rate, the improvement further comprising the steps of:

deflecting said workpiece and said components said second predetermined amount by contacting and rapidly advancing the movable member into the other member for said second predetermined amount;

immediately thereafter advancing the movable member at said second constant predetermined lineal rate toward the other member whereby said workpiece and said components of said grinding machine remain deflected said second predetermined amount and wherein said second constant predetermined lineal rate is less than said first constant predetermined lineal rate; and thereafter rapidly retracting the movable member away from the other member so that the grinding wheel is moved out of contact with said workpiece when the diameter of said workpiece attains a second predetermined size.

* * * * *